(12) United States Patent
Furuya (10) Patent No.: US 8,025,707 B2
(45) Date of Patent: Sep. 27, 2011

(54) AIR CLEANER AND ENGINE INCLUDING THE SAME

(75) Inventor: Akira Furuya, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/314,932

(22) Filed: Dec. 18, 2008

(65) Prior Publication Data

US 2009/0159039 A1 Jun. 25, 2009

(51) Int. Cl.
*B01D 50/00* (2006.01)
*F02M 35/024* (2006.01)

(52) U.S. Cl. .................. 55/385.3; 55/418; 55/DIG. 28; 123/198 E (58) Field of Classification Search .............. 55/466, 55/318, 497, 385.3, 319, 337, DIG. 28; 123/198 E, 123/519; 261/DIG. 68; 96/133, 147, 380, 96/383; 180/68.3; 248/311.2
See application file for complete search history.

(56) References Cited

U.S. PATENT DOCUMENTS

| | | | | |
|---|---|---|---|---|
| 5,918,576 A * | 7/1999 | Ohoka et al. | | 123/198 E |
| 6,395,049 B2 * | 5/2002 | Knodler et al. | | 55/385.3 |
| 6,761,748 B2 * | 7/2004 | Schenk et al. | | 55/385.3 |
| 7,393,372 B2 * | 7/2008 | Cassell et al. | | 55/310 |
| 2005/0247034 A1 * | 11/2005 | Canova et al. | | 55/385.3 |
| 2009/0126678 A1 * | 5/2009 | Takeuchi et al. | | 123/198 E |
| 2009/0133663 A1 * | 5/2009 | Maeda et al. | | 123/198 E |

FOREIGN PATENT DOCUMENTS

| JP | 1-15886 | 5/1989 |
|---|---|---|
| JP | 6-40350 | 5/1994 |

* cited by examiner

*Primary Examiner* — Duane Smith
*Assistant Examiner* — Minh-Chau Pham
(74) *Attorney, Agent, or Firm* — Smith, Gambrell & Russell, LLP (57) ABSTRACT

A tubular channel is disposed in a path of air that flows from an inlet to a dirty side. The cross sectional area of the tubular channel is smaller than the cross-sectional area of the inlet. A dust outlet is disposed in a wall in a path of the air that flows out of the exit of the tubular channels to the dirty side. The dust outlet extends through the wall of the air cleaner from the inside to the outside. As the air blasts out of the dust outlet, dust in the air cleaner is discharged to the outside.

8 Claims, 8 Drawing Sheets

AIR CLEANER AND ENGINE INCLUDING THE SAME

CROSS-REFERENCE TO RELATED APPLICATIONS

The disclosure of Japanese Patent Application No. 2007-326668 filed on Dec. 19, 2007 including the specification, drawings and abstract is incorporated herein by reference in its entirety.

BACKGROUND OF THE INVENTION

1. Field of the Invention

The present invention relates to an air cleaner and an engine including the air cleaner.

2. Description of the Related Art

An air cleaner, which is a component for filtering and clarifying air that is supplied to an engine, is disposed in a path along which the air is supplied. Japanese Unexamined Utility Model Registration Application Publication No. 06-40350 discloses an air cleaner having a baffle near an inlet for reducing the amount of dust (particles, water droplets, and the like) that reaches an element (filter). Japanese Examined Utility Model Registration Application Publication No. 01-15886 discloses an air cleaner having protrusions around an inlet for preventing unwanted objects from entering through the inlet.

In general, air cleaners including the above-mentioned examples of the existing art, are designed on the basis of an airtight structure in which air that is drawn in through the inlet does not leak to the outside on the way to the element in the air cleaner. With such a design, all intaken air reaches the element and a lot of dust is deposited on the element. As a result, the element has to be cleaned or replaced frequently.

SUMMARY OF THE INVENTION

The present invention, which is achieved against such a background, aims to reduce the amount of dust that is deposited on an element in an air cleaner.

To overcome the above-described problem, a first aspect of the invention provides an air cleaner that has an inside divided into a dirty side and a clean side by an element, filters out dust contained in air drawn in from the outside at the dirty side with the element, and delivers the air that has been clarified to the clean side. The air cleaner includes an inlet, a tubular channel, a dust outlet, and an air outlet. The inlet draws air in from the outside. The tubular channel, which is disposed in a path of the air flowing from the inlet to the dirty side, has a cross-sectional area smaller than the cross-sectional area of the inlet. The dust outlet, which is formed in a path of the air having passed through the tubular channel and flowing to the dirty side, extends through the air cleaner from the inside to the outside. The air outlet communicates with the clean side and discharges the air that has been clarified to the outside. At this time, Dust in the air cleaner is discharged to the outside with the air due to blast out the air through the dust outlet.

In the first aspect of the invention, it is preferable that the inlet be disposed at a position higher than the air outlet, and the tubular channel extends linearly in the up-down direction.

In the first aspect of the invention, it is preferable that the air cleaner further include a dust chamber, for temporarily retaining the air, disposed in the path of the air having passed through the tubular channel and flowing to the dirty side, and the dust outlet be disposed at the bottom of the dust chamber.

In the first aspect of the invention, it is preferable that the air cleaner be formed by assembling a body and a cover, the element be pinched between the body and the cover, and the dust outlet be a gap between the body and the cover.

A second aspect of the present invention provides an engine including an air cleaner that has an inside divided into a dirty side and a clean side by an element, filters out dust contained in air drawn in from the outside at the dirty side with the element, and delivers the air that has been clarified to the clean side. The air cleaner included in the engine includes an inlet, a tubular channel, a dust outlet, and an air outlet. The inlet draws air in from the outside. The tubular channel, which is disposed in a path of the air flowing from the inlet to the dirty side, has a cross-sectional area smaller than the cross-sectional area of the inlet. The dust outlet, which is formed in a path of the air having passed through the tubular channel and flowing to the dirty side, extends through the air cleaner from the inside to the outside. The air outlet communicates with the clean side and discharges the air that has been clarified to an air intake of the engine. At this time, Dust in the air cleaner is discharged to the outside together with the air due to blast out the air through the dust outlet.

According to an aspect of the present invention, the air drawn in from the outside is accelerated as the air passes through the tubular channel whose cross-sectional area is smaller than the cross sectional area of the inlet. A part of the accelerated air blow out through the dust outlet disposed in the path to the dirty side, thereby discharging the dust contained in the dirty side. Therefore, the amount of dust that is deposited on the element is reduced.

DESCRIPTION OF THE PREFERRED EMBODIMENTS

Figure 1:
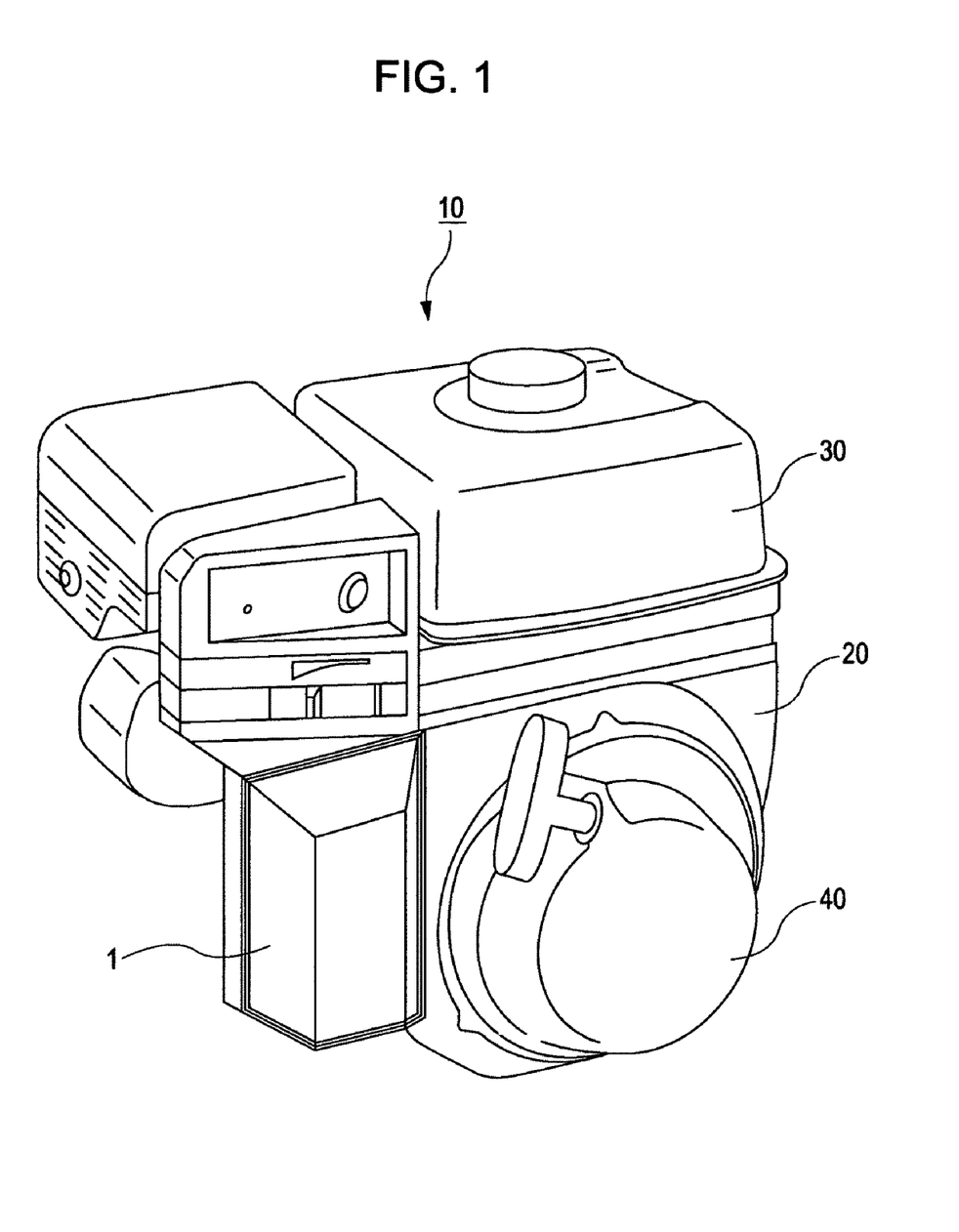
FIG. 1 shows an external perspective view of a general-purpose engine.

FIG. 1 shows an external perspective view of a general-purpose engine 10 including an air cleaner 1 according to an embodiment of the present invention. As with an ordinary general-purpose engine, the general-purpose engine 10 has an integrated structure including an engine body 20, a fuel tank 30, and a starter 40. The fuel tank 30, which holds fuel, is mounted on top of the engine body 20. The starter 40, which is used to provide a driving force for starting the engine body 20, is mounted on a side of the engine body 20. The general-purpose engine 10 also includes an air cleaner 1. The air cleaner 1, being disposed so as to cover an air intake of the engine body 20, filters and clarifies the air supplied to the air intake of the engine body 20.

Figure 2:
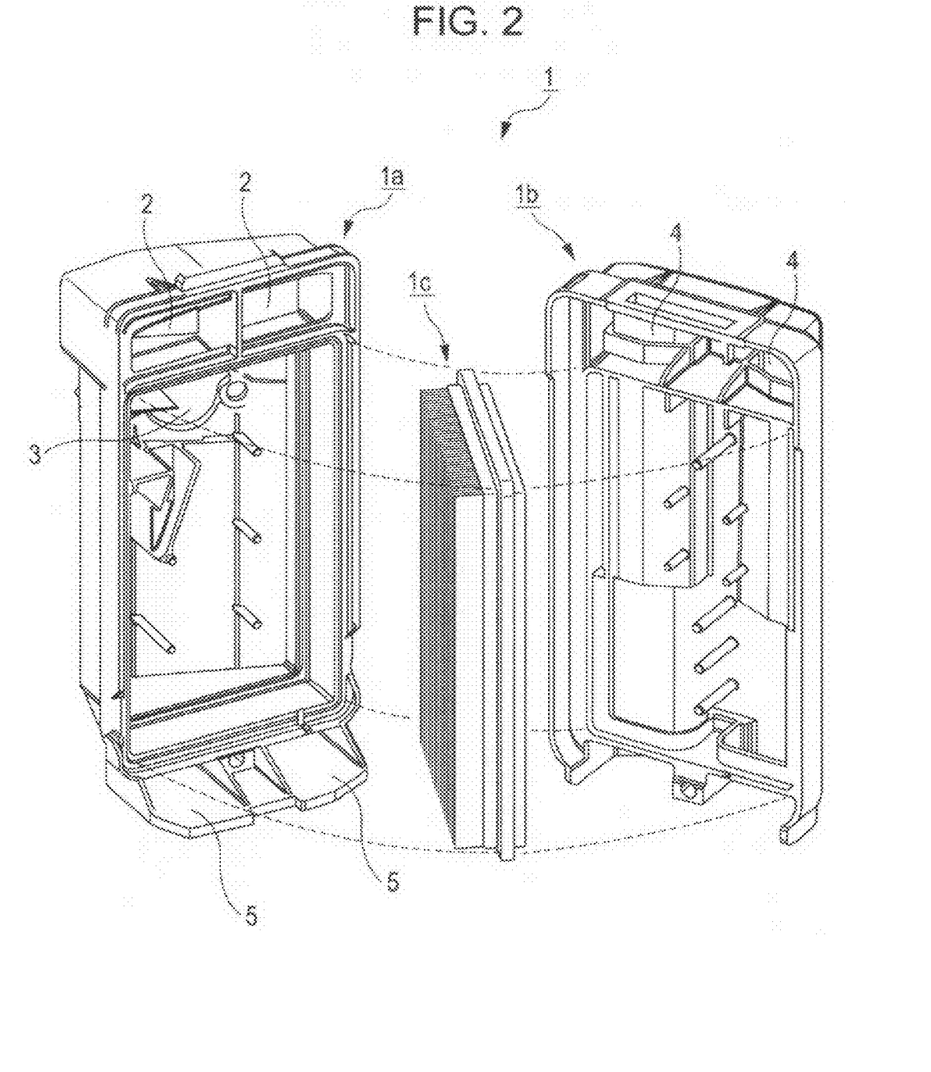
FIG. 2 shows a developed perspective view of an air cleaner.
Figure 3:
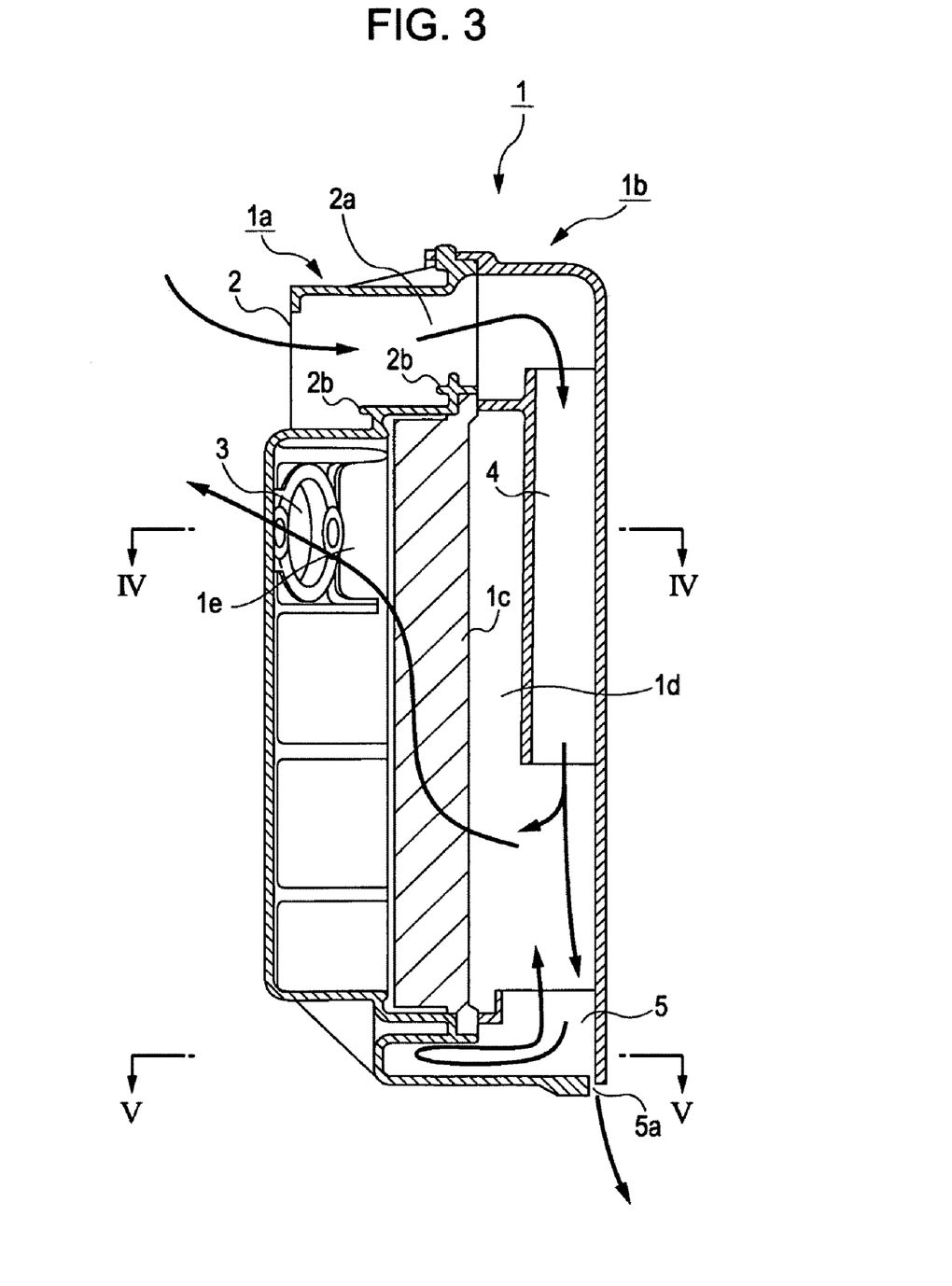
FIG. 3 shows a longitudinal sectional view of the air cleaner.

FIG. 2 shows a developed perspective view of the air cleaner 1. FIG. 3 shows a longitudinal sectional view of the air cleaner 1. The air cleaner 1 includes a body 1a, a cover 1b, and an element 1c. The body 1a and the cover 1b are assembled by mating the corresponding surfaces. In the assembly of the body 1a and the cover 1b, the element 1c is pinched and fixed between holding portions formed on the body 1a and the cover 1b.

The body 1a has inlets 2 and an air outlet 3, which are formed integrally with the body 1a. Air is drawn into the air cleaner 1 through the inlets 2. The air outlet 3 communicates with the air intake of the general-purpose engine 10 when the air cleaner 1 is attached to the general-purpose engine 10. The inlets 2 are disposed in the upper part of the air cleaner 1 so as to be positioned above the air outlet 3. This positioning serves to supply warm air to the engine body 20 and improve thermal efficiency of the general-purpose engine 10. The cover 1b has a plurality of (in this embodiment, two) tubular channels 4, which are formed integrally with the cover 1b. The tubular channels 4 extend from the upper part to the lower part of the air cleaner 1 (more specifically, in the up-down or vertical direction). The element 1c is a filter for filtering and clarifying dust-containing air that is drawn in through the inlets 2. The element 1c is disposed so as to cover the air outlet 3 entirely. The element 1c divides the inside of the air cleaner 1 into a dirty side 1d and a clean side 1e. The dirty side 1d is a section in which air has not yet been filtered by the element 1c. The clean side 1e is a section in which air has been filtered by the element 1c.

As shown in FIG. 3, an air intake channel 2a, which extends in the horizontal direction, is formed in the air cleaner 1. One end of the air intake channel 2a communicates with the inlets 2, and the other end of the air intake channel 2a communicates with the tubular channels 4. The floor of the air intake channel 2a on the body 1a side is stepped such that the height of the floor increases stepwise with increasing distance from the inlets 2. The stepped floor has two steps provided with barrier walls 2b. Each of the barrier walls 2b protrudes so as to overlap the floor with a certain distance therebetween. This structure serves to prevent rainwater or the like, which may be contained in external air, from flowing into the air cleaner 1 along the floor.

The tubular channels 4 are disposed in a path of air that flows from the inlets 2 to the dirty side 1d. Each of the tubular channels 4 has an opening near a part of the cover 1b at the end of the air intake channel 2a communicating with the inlets 2. The tubular channels 4 extend linearly downward. Air, which is drawn in through the inlets 2, flows through the air intake channel 2a into the openings (inlets) of the tubular channels 4.

The cross-sectional area of the tubular channels 4 is smaller than the cross-sectional area of the inlets 2. Therefore, pressure of the air that flows through the tubular channels 4 is higher than the pressure of the air that flows through the inlets 2, and the velocity of the air that flows through the tubular channels 4 is higher than the velocity of the air that flows through the inlets 2. Since the velocity of the air that flows through the inlets 2 is relatively low, dust (including particles and water droplets) is made less likely to enter through the inlets 2. As an example, the cross-sectional area of the inlets 2 may be more than three times larger than the cross-sectional area of the tubular channels 4. Note that the air that reaches the dirty side 1d is the air that has entered the inlets 2 and passed at least through the air intake channel 2a and the tubular channels 4.

Figure 4:
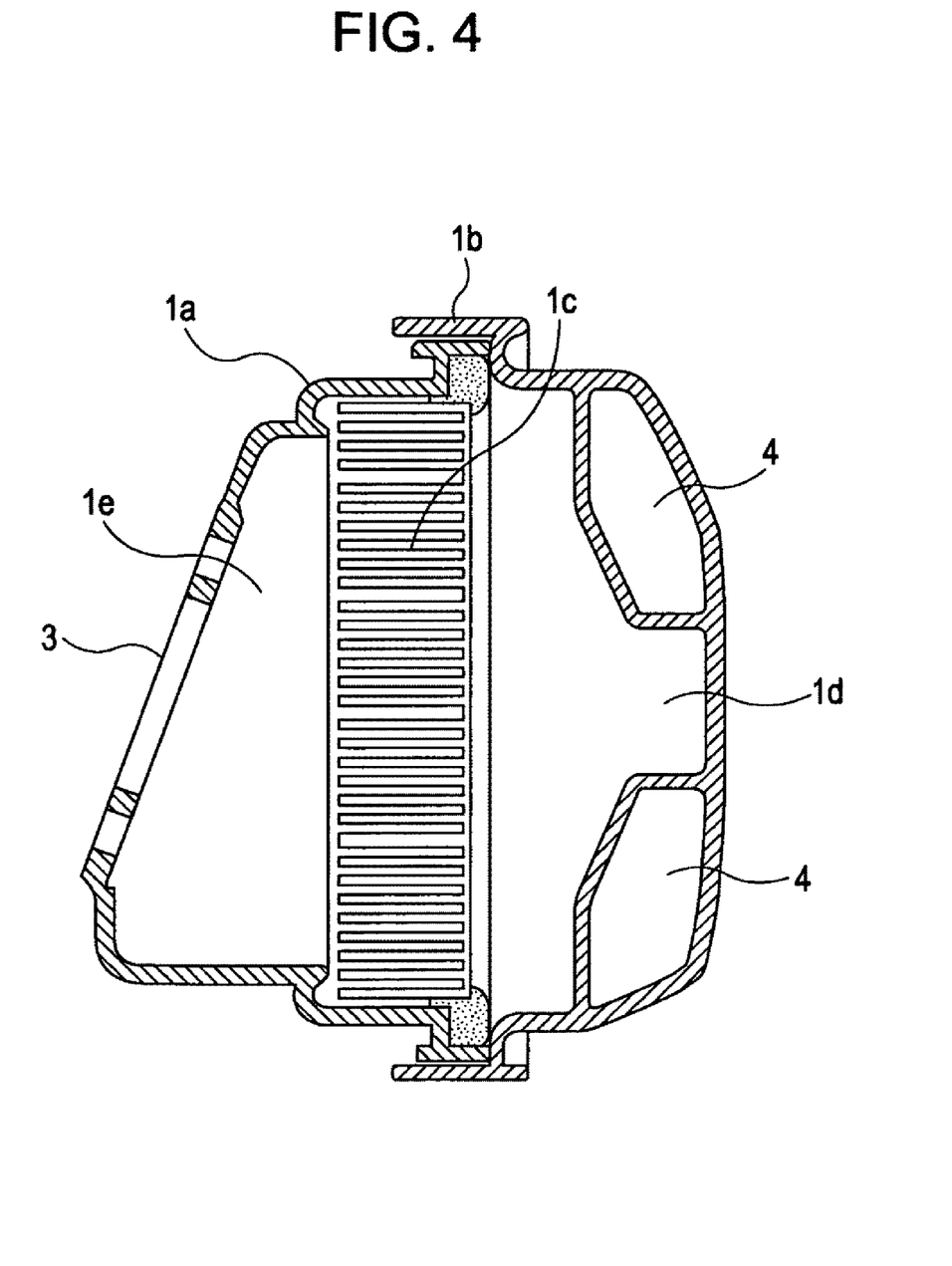
FIG. 4 shows a transverse sectional view of the air cleaner.

FIG. 4 shows a transverse sectional view of the air cleaner 1 at the position of the air outlet 3 (taken along segment IV-IV) in FIG. 3. The tubular channels 4 are disposed so as to extend in the up-down (vertical) direction from near the distal end, as viewed from the inlets 2, of the air intake channel 2a. Each of the tubular channels 4 has an appropriate length (about 130 mm, for example) such that sound pressure energy generated by intake air is transformed into velocity energy and air intake noise is reduced.

Dust chambers 5 are disposed on the opposite side to the air intake channel 2a across the tubular channels 4 (on the exit side of the air intake channel 2a), that is, at the lower part of the air cleaner 1. The dust chambers 5 are formed by joining the body 1a and the cover 1b. The dust chambers 5, which are disposed in a path of air that flows out of the exit of the tubular channels 4 to the dirty side 1d, serve to retain air temporarily. It is not necessary that the dust chambers 5 be directly connected to the tubular channels 4.

Figure 5:
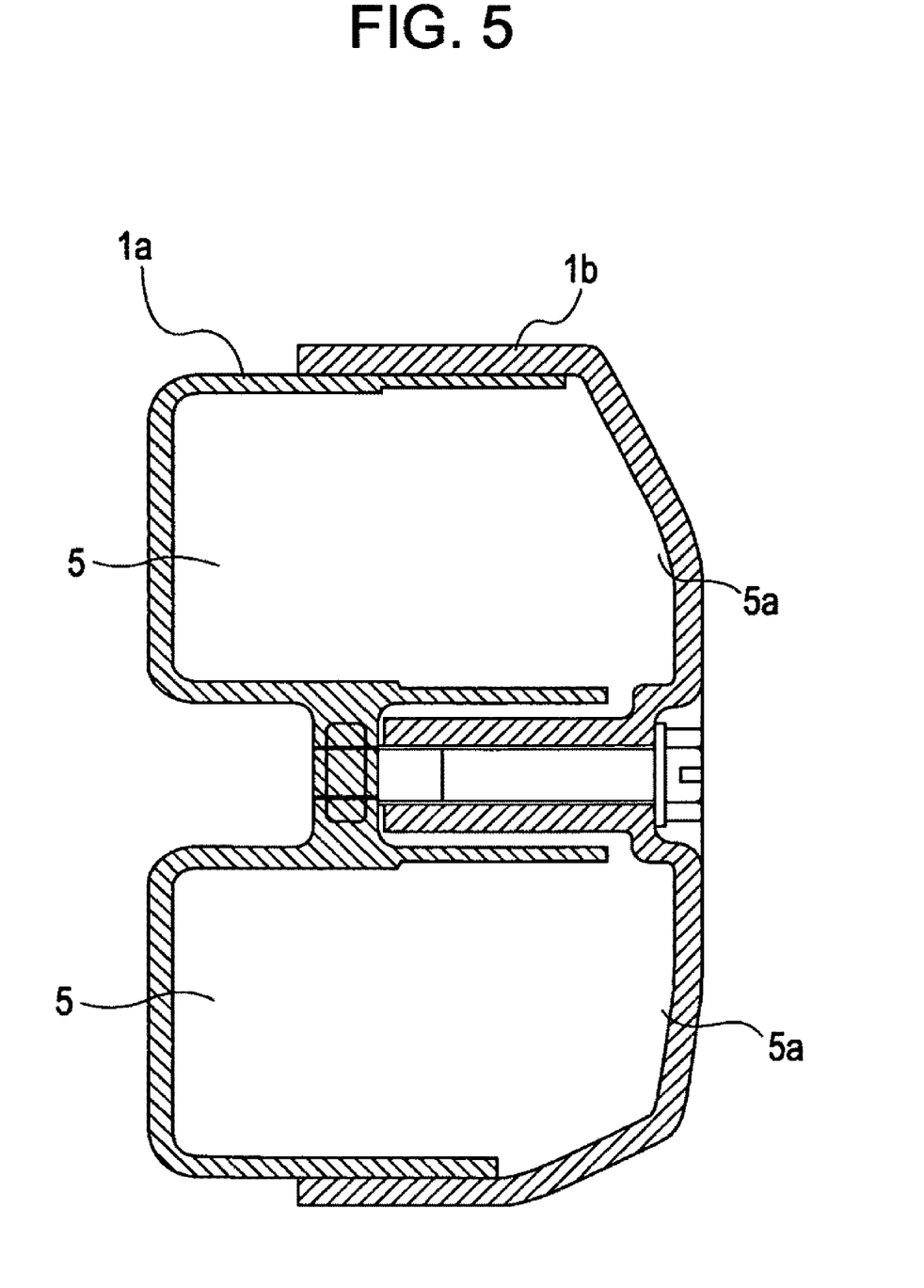
FIG. 5 shows a transverse sectional view of the air cleaner.

FIG. 5 shows a transverse sectional view of an air cleaner 1 at the position of the dust chambers 5 (taken along segment V-V) in FIG. 3. A dust outlet 5a is disposed at the bottom of each of the dust chambers 5. The dust outlets 5a are disposed in the path of air that flows out of the exit of the tubular channels 4 to the dirty side 1. The dust outlets 5a extend through the wall of the air cleaner 1 from the inside to the outside. Air is accelerated through the tubular channels 4 and blasts out of the dust outlets 5a. As the air blasts out, dust in the air cleaner 1 is discharged to the outside. In this embodiment, the dust outlets 5a are gaps that are formed between the body 1a and the cover 1b. With this structure, the dust outlets 5a can be formed easily without making a through hole in the body 1a or the cover 1b.

When the general-purpose engine 10 is being driven, external air including dust is drawn in through the inlets 2 and flows through the intake channel 2a into the tubular channels 4. The air passes through the tubular channels 4 and reaches the dirty side 1d. Then, the air is filtered through the element 1c and delivered from the clean side 1e to the air outlet 3 so as to be discharged to the outside (to the air intake of the general-purpose engine 10). The air is accelerated during this process, because a pulsating flow, which is generated by cyclical intake of air by the general-purpose engine 10, applies a pressure to the air in the air cleaner 1. Due to the acceleration, a part of the air discharged out of the exit of the tubular channels 4 flows into the dust chambers 5 disposed beyond the exit of the tubular channels 4, instead of flowing directly into the dirty side 1d. That is, the air bifurcates after being discharged out of the exit of the tubular channels 4. It is preferable that the tubular channels 4 be linear so that the pulsating flow accelerates the air efficiently.

The air that flowed into the dust chambers 5 is guided along (turned around with) the walls of the dust chambers 5. Then, the air flows back toward the exit of the tubular channels 4 due to the pulsating flow and reaches the dirty side 1d. As described above, the dust outlets 5a are disposed in the walls of the dust chambers 5. Therefore, a part of the air that is accelerated in the tubular channels 4 hits the walls of the dust chambers 5 having the dust outlets 5a, and is blasted out through the dust outlets 5a. At this time, dust is discharged out of the air cleaner 1 together with the air.

The dust that falls under its own weight and accumulates in each of the dust chambers 5 is also discharged through the dust outlets 5a. Note that external air is not drawn in through the dust outlets 5a, because the pressure of the air blown out of the tubular channels 4 is high.

In this embodiment, the air drawn in through the inlets 2 passes through the tubular channels 4. Since the cross-sectional area of the tubular channels 4 is smaller than the cross-sectional area of the inlets 2, the air drawn in from outside is accelerated. The acceleration of the air creates a bypass path of the air that is different from the path of the air directly extending from the exit of the tubular channels 4 to the dirty side 1d. The pressure of air that passes through this bypass path discharges dust in the air cleaner 1 to the outside. This structure serves to reduce the amount of dust that is deposited on the element 1c and extends the length of the replacement (maintenance) cycle of the element 1c. Moreover, since the air cleaner 1 includes only the body 1a, the cover 1b, and the element 1c, the air cleaner 1 can be manufactured with a simple mold structure at low cost.

Figure 6:
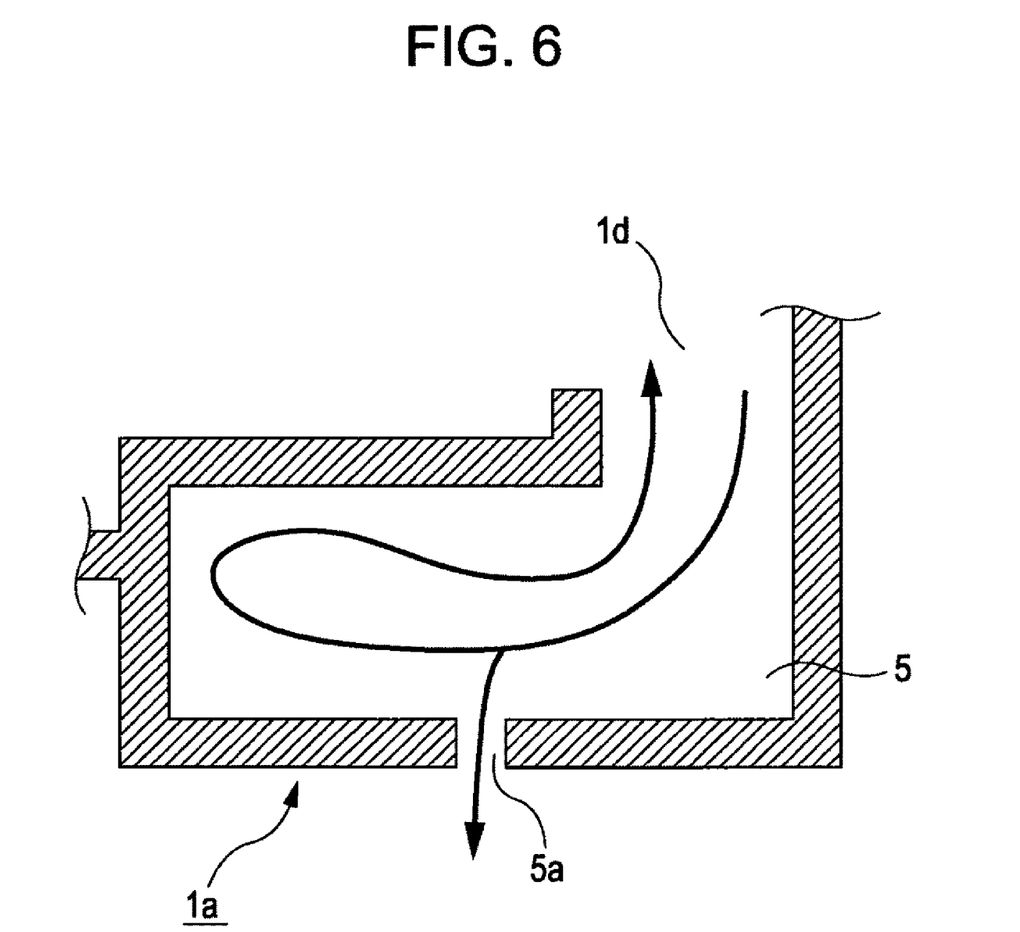
FIG. 6 shows a modified dust chamber.
Figure 7:
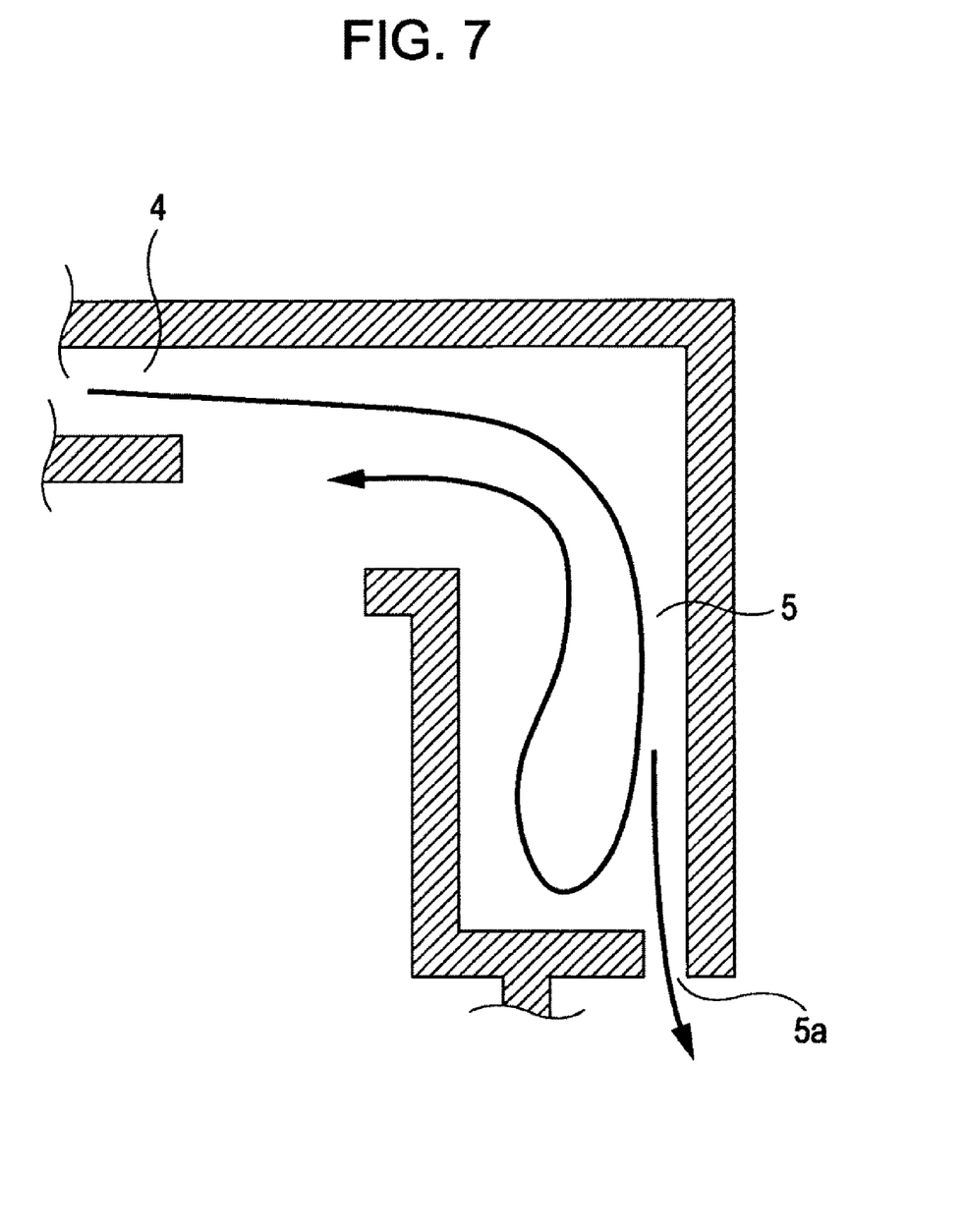
FIG. 7 shows a modified dust chamber.
Figure 8:
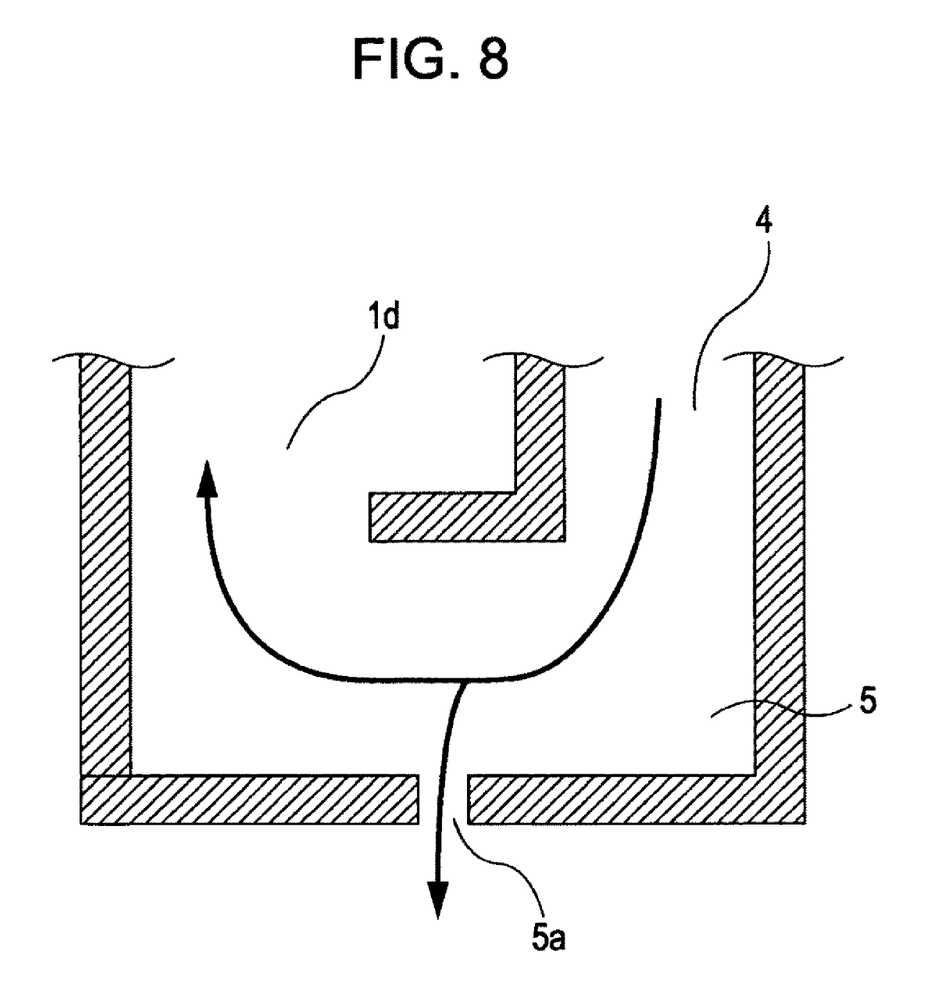
FIG. 8 shows a modified dust chamber.

The shape and the position of each dust outlet 5a may be modified in a variety of ways including configurations shown in FIGS. 6 to 8. In a configuration shown in FIG. 6, dust outlets 5a are formed in the wall of the body 1a (or the cover 1b) by which the dust chambers 5 are formed. In this case, it is preferable that the dust outlets 5a be disposed directly under the tubular channels 4. However, the dust outlets 5a may be disposed anywhere along the path of the air that has been accelerated through the tubular channels 4. As long as the dust outlets 5a are disposed on the path of the accelerated air, the dust is effectively discharged with the blasting pressure of the accelerated air.

In a configuration shown in FIG. 7, the tubular channels 4 extend in the horizontal (left-right) direction of the air cleaner 1, instead of the vertical (up-down) direction, and the dust chambers 5 are disposed beyond the exit of the tubular channels 4. Dust outlets 5a are disposed at the bottom the dust chambers 5 where dust tends to accumulate.

In a configuration shown in FIG. 8, dust outlets 5a are disposed not in the dust chambers 5 but in the wall of the air cleaner 1 in the path of the air that flows out of the exit of the tubular channels 4 to the dirty side 1d. In this configuration, all the air flowing out of the tubular channels 4 passes through the path in which the dust outlets 5a are disposed.

What is claimed is:

1. An air cleaner that has an inside divided into a dirty side and a clean side by an element, filters out dust contained in air drawn in from the outside at the dirty side with the element, and delivers the air that has been clarified to the clean side, the air cleaner comprising:
   an inlet through which the air is drawn in from the outside;
   a tubular channel that is disposed to define a path of the air flowing from the inlet to the dirty side, the tubular channel having a cross-sectional area smaller than a cross-sectional area of the inlet;
   a dust outlet that is formed in a path of the air having passed through the tubular channel and flowing to the dirty side, the dust outlet extending through the air cleaner from the inside to the outside; and
   an air outlet that communicates with the clean side and discharges the air that has been clarified to the outside,
   wherein dust in the air cleaner is discharged to the outside together with the air that blasts out through the dust outlet.

2. The air cleaner according to claim 1, wherein the inlet is disposed at a position higher than the air outlet.

3. The air cleaner according to claim 1, wherein the tubular channel extends linearly in the up-down direction.

4. The air cleaner according to claim 1, further comprising:
   a dust chamber for temporarily retaining the air, the dust chamber being disposed in the path of the air having passed through the tubular channel and flowing to the dirty side,
   wherein the dust outlet is disposed at the bottom of the dust chamber.

5. The air cleaner according to claim 1, wherein the air cleaner is formed by assembling a body and a cover, the element is pinched between the body and the cover, and the dust outlet is a gap between the body and the cover.

6. An engine comprising:
   an air cleaner that has an inside divided into a dirty side and a clean side by an element, filters out dust contained in air drawn in from the outside at the dirty side with the element, and delivers the air that has been clarified to the clean side, the air cleaner including
   an inlet through which air is drawn in from the outside;
   a tubular channel that is disposed to define a path of the air flowing from the inlet to the dirty side, the tubular channel having a cross-sectional area smaller than a cross-sectional area of the inlet;
   a dust outlet that is formed in a path of the air having passed through the tubular channel and flowing to the dirty side, the dust outlet extending through the air cleaner from the inside to the outside; and
   an air outlet that communicates with the clean side and discharges the air that has been clarified to an air intake of the engine,
   wherein the dust in the air cleaner is discharged to the outside together with the air that blasts out through the dust outlet.

7. The air cleaner according to claim 1, wherein said tubular channel is linear in extension and configured to accelerate air received from said inlet such that a portion of the air discharged out of said tubular channel, and flowing within the dirty side, is directed linearly to said dust outlet.

8. The engine according to claim 6 wherein said tubular channel is linear in extension and configured to accelerate air received from said inlet such that a portion of the air discharged out of said tubular channel, and flowing within the dirty side, is directed linearly to said dust outlet.

* * * * *